US012019238B2

(12) United States Patent
Myhre et al.

(10) Patent No.: US 12,019,238 B2
(45) Date of Patent: Jun. 25, 2024

(54) OPTICAL SYSTEMS FOR DISPLAYS

(71) Applicant: Apple Inc., Cupertino, CA (US)

(72) Inventors: Graham B. Myhre, San Jose, CA (US); Eric J. Hansotte, Morgan Hill, CA (US); Guolin Peng, Santa Clara, CA (US); Hyungryul Choi, San Jose, CA (US); Se Baek Oh, Millbrae, CA (US); Paul Gelsinger-Austin, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 16/089,006

(22) PCT Filed: Jun. 6, 2017

(86) PCT No.: PCT/US2017/036205
§ 371 (c)(1),
(2) Date: Sep. 27, 2018

(87) PCT Pub. No.: WO2017/222808
PCT Pub. Date: Dec. 28, 2017

(65) Prior Publication Data
US 2019/0377181 A1 Dec. 12, 2019

Related U.S. Application Data

(60) Provisional application No. 62/352,754, filed on Jun. 21, 2016.

(51) Int. Cl.
G02B 27/01 (2006.01)
F21V 8/00 (2006.01)

(52) U.S. Cl.
CPC ....... *G02B 27/0172* (2013.01); *G02B 6/0023* (2013.01); *G02B 6/0035* (2013.01);
(Continued)

(58) Field of Classification Search
None
See application file for complete search history.

(56) References Cited

U.S. PATENT DOCUMENTS 6,580,529 B1 6/2003 Amitai et al.
7,206,107 B2 * 4/2007 Levola ............... G02B 27/4272
359/566
(Continued)

FOREIGN PATENT DOCUMENTS

CN 101103299 A 1/2008
CN 102213831 A 10/2011
(Continued)

*Primary Examiner* — Christopher Stanford
*Assistant Examiner* — Journey F Sumlar
(74) *Attorney, Agent, or Firm* — Treyz Law Group, P.C.; Kendall P. Woodruff

(57) ABSTRACT

An electronic device may include a display system for presenting images close to a user's eyes. The display system may include a display unit that directs light and an optical system that redirects the light from the display unit towards a user's eyes. The optical system may include an input coupler and an output coupler formed on a waveguide. The input coupler may redirect light from the display unit so that it propagates in the waveguide towards the output coupler. The output coupler may redirect the light from the input coupler so that it exits the waveguide towards the user's eyes. A light-redirecting element may be used to redirect edge light that would otherwise be outside of the user's field of view towards the user's eyes.

16 Claims, 7 Drawing Sheets

(52) U.S. Cl.
CPC ............... *G02B 2027/0123* (2013.01); *G02B 2027/0174* (2013.01); *G02B 2027/0178* (2013.01)

(56) References Cited

U.S. PATENT DOCUMENTS

| | | |
|---|---|---|
| 8,233,204 B1 | 7/2012 | Robbins et al. |
| 8,320,032 B2 * | 11/2012 | Levola ............... G02B 27/0081 359/13 |
| 8,736,963 B2 | 5/2014 | Robbins et al. |
| 2007/0188837 A1 | 8/2007 | Shimizu et al. |
| 2015/0016777 A1 * | 1/2015 | Abovitz ............. G02B 27/0093 385/37 |
| 2015/0153569 A1 | 6/2015 | Yonekubo |
| 2016/0124223 A1 | 5/2016 | Shinbo et al. |
| 2017/0357089 A1 * | 12/2017 | Tervo .................... G02B 6/005 |

FOREIGN PATENT DOCUMENTS

| | | |
|---|---|---|
| CN | 104040410 A | 9/2014 |
| CN | 105572873 A | 5/2016 |
| JP | 2007219106 A | 8/2007 |
| JP | 2010282231 A | 12/2010 |
| JP | 2016085430 A | 5/2016 |
| KR | 1020140077378 A | 6/2014 |
| KR | 1020160052334 A | 5/2016 |
| WO | 2004109349 A2 | 12/2004 |
| WO | 2008148927 A1 | 12/2008 |
| WO | 2014109115 A1 | 7/2014 |

* cited by examiner

OPTICAL SYSTEMS FOR DISPLAYS

This application claims priority to U.S. provisional patent application No. 62/352,754, filed on Jun. 21, 2016, which is hereby incorporated by reference herein in its entirety.

BACKGROUND

This relates generally to optical systems and, more particularly, to optical systems for near-eye displays.

Electronic devices may include near-eye displays that present images close to a user's eyes. For example, devices such as virtual reality and augmented reality headsets may include near-eye displays with optical elements that allow users to view the displays.

It can be challenging to design devices such as these. If care is not taken, some of the field of view produced by a near-eye display may not be viewable from a single eye position.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include a display unit that directs light and an optical system that redirects the light from the display unit towards a user's eyes. The optical system may include an input coupler and an output coupler formed on a waveguide. The input coupler may redirect light from the display unit so that it propagates in the waveguide towards the output coupler. The output coupler may redirect the light from the input coupler so that it exits the waveguide towards the user's eyes. The input and output couplers may be formed from holographic optical elements such as thin holograms, volume holograms, or surface relief gratings.

A light-redirecting element may be used to redirect or redistribute light that would otherwise be outside of the user's field of view towards the user's eyes. The light-redirecting element may be interposed between the display unit and the input coupler, may be interposed between the input coupler and the output coupler, or may be integrated with the output coupler.

In arrangements where the light-redirecting element is interposed between the display unit and the input coupler, the light-redirecting element may include a secondary input coupler and a secondary output coupler on a second waveguide.

In arrangements where the light-redirecting element is interposed between the input coupler and the output coupler, the light-redirecting element may include a secondary input coupler and a secondary output coupler on the same waveguide as the primary input and output couplers. In other arrangements, the light-redirecting element may be formed from one holographic element (e.g., serving as both an input and output coupler) between the input coupler and the output coupler.

In arrangements where the light-redirecting element is integrated (e.g., multiplexed) with the output coupler, the light-redirecting element may include one or more interference patterns that are non-parallel with the interference patterns of the output coupler.

DETAILED DESCRIPTION

Figure 1:
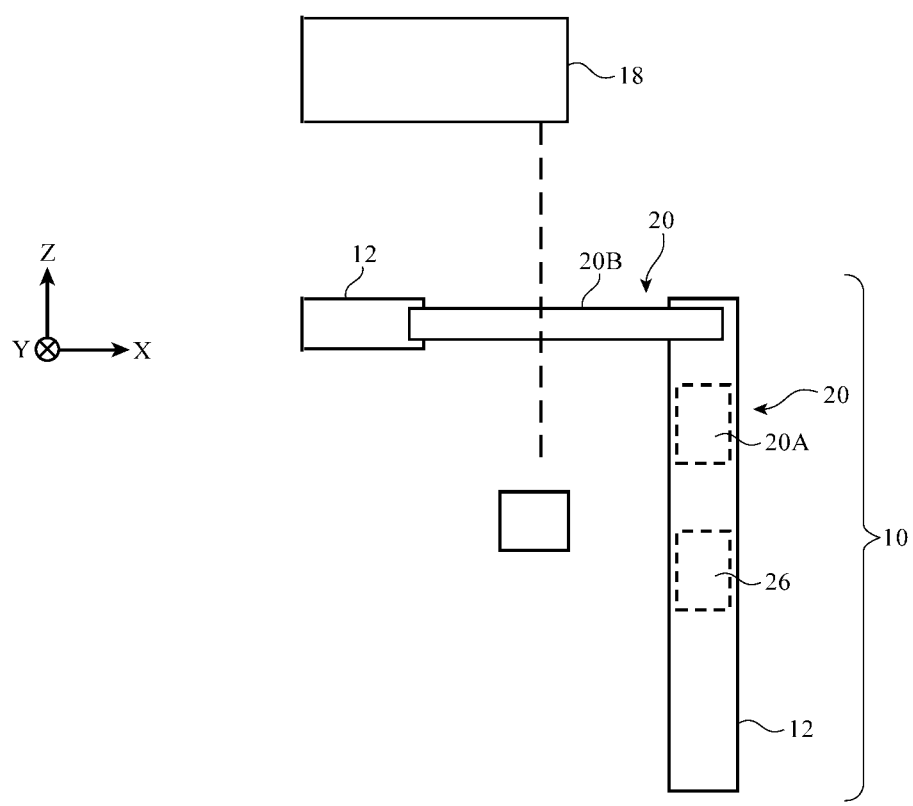
FIG. 1 is a diagram of an illustrative electronic device having a near-eye display system in accordance with an embodiment.

An illustrative system having a device with one or more near-eye display systems is shown in FIG. 1. System 10 may be a head-mounted device having one or more displays such as near-eye display 20 mounted to support structure 12. Support structure 12 may have the shape of a pair of eyeglasses (e.g., supporting frames), may form a housing having a helmet shape, or may have other configurations to help in mounting and securing the components of near-eye display 20 on the head or near the eye of a user. Near-eye display 20 may include one or more display modules such as display 20A and one or more optical systems such as optical system 20B. Display module 20A may be mounted in a support structure such as support structure 12. Display module 20A may emit light that is redirected towards a user's eye 16 using an associated optical system 20B. If desired, system 10 may include two near-eye displays 20 (e.g., one for each of the user's eyes), each having a respective display module 20A and optical system 20B.

Display 20A may be a liquid crystal display, an organic light-emitting diode display, or display of other types. Optical system 20B may form a lens that allows a viewer (e.g., viewer's eye 16) to view images on display 20. There may be two optical systems 20B (e.g., for forming left and right lenses) associated with respective left and right eyes 16. A single display 20 may produce images for one or both eyes 16, or a pair of displays 20 may be used to display images for eyes 16. As an example, displays 20 may include a left display module 20A aligned with a left optical system 20B and a viewer's left eye and may include a right display module 20A aligned with a right optical system 20B and a viewer's right eye. In configurations with multiple displays, the focal length and positions of the lenses formed by components 20B may be selected so that any gap present between the displays will not be visible to a user (i.e., so that the images of the left and right displays overlap or merge seamlessly).

In configurations in which system 10 is a pair of virtual reality glasses, near-eye display 20 may obscure the user's view of the user's surrounding environment. In configurations in which system 10 is a pair of augmented reality glasses, display 20 may be transparent and/or display 20 may be provided with optical mixers such as half-silvered mirrors to allow viewer 16 to simultaneously view images on display 20 and external objects such as object 18 in the surrounding environment.

System 10 may include control circuitry 26. Control circuitry 26 may include processing circuitry such as microprocessors, digital signal processors, microcontrollers, baseband processors, image processors, application-specific integrated circuits with processing circuitry, and/or other processing circuitry and may include random-access memory, read-only memory, flash storage, hard disk storage, and/or other storage (e.g., a non-transitory storage media for storing computer instructions for software that runs on control circuitry 26).

System 10 may include input-output circuitry such as touch sensors, buttons, microphones to gather voice input and other input, sensors, and other devices that gather input (e.g., user input from viewer 16) and may include light-emitting diodes, one or more displays 20, speakers, and other devices for providing output (e.g., output for viewer 16). System 10 may, if desired, include wireless circuitry and/or other circuitry to support communications with a computer or other external equipment (e.g., a computer that supplies display(s) 20 with image content). If desired, sensors such as an accelerometer, compass, an ambient light sensor or other light detector, a proximity sensor, a scanning laser system, an images sensor, and/or other sensors may be used in gathering input during operation of display 20. During operation, control circuitry 26 may supply image content to display 20. The content may be remotely received (e.g., from a computer or other content source coupled to system 10) and/or may be generated by control circuitry 26 (e.g., text, other computer-generated content, etc.). The content that is supplied to display 20 by control circuitry 26 may be viewed by viewer 16.

FIG. 2 is a top view of an illustrative near-eye display 20 that may be used in system 10 of FIG. 1. As shown in FIG. 2, near-eye display 20 may include one or more display modules such as display module 20A and an optical system such as optical system 20B. Optical system 20B may include optical elements such as waveguide 28, input coupler 30, and output coupler 32. Display module 20A may include a display unit 36 and a collimating lens 34. If desired, display module 20A may be mounted within support structure 12 of FIG. 1 while optical system 20B may be mounted between portions of support structure 12 (e.g., to form a lens that aligns with a user's eyes 16). Other mounting arrangements may be used, if desired.

Display unit 36 may be a display unit based on a liquid crystal display, organic light-emitting diode display, cathode ray tube, plasma display, projector display (e.g., a projector based on an array of micromirrors), liquid crystal on silicon display, or other suitable type of display. Display 36 may generate light 38 associated with three-dimensional content to be displayed to viewer 16. Light 38 may be collimated using a lens such as collimating lens 34. Optical system 20B may be used to present light 38 output from display unit 36 to viewer 16.

Figure 2A:
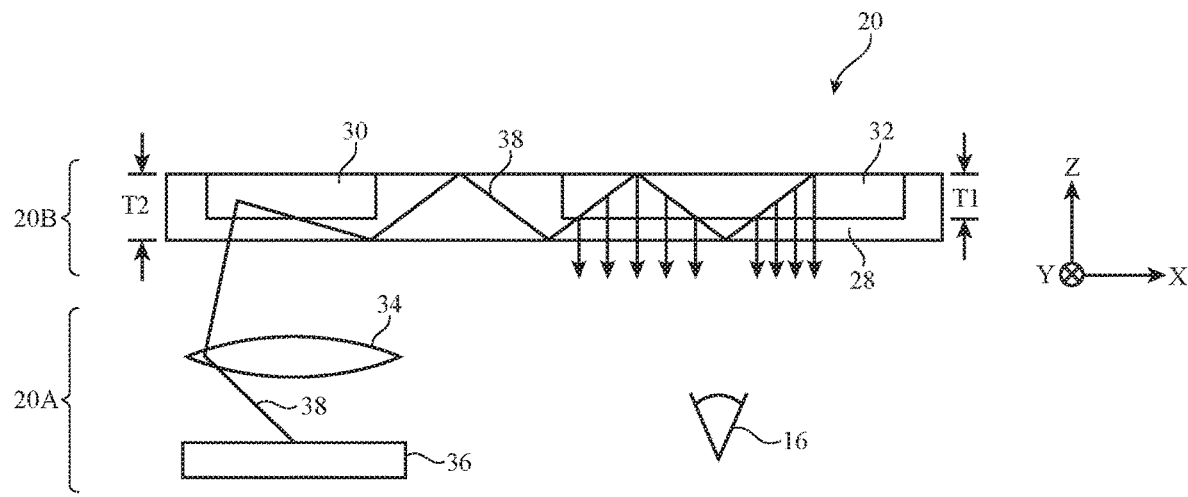
FIG. 2A is a top view of an illustrative near-eye display system having an optical system including an input coupler and an output coupler at least partially embedded in a waveguide substrate in accordance with an embodiment.
Figure 2B:
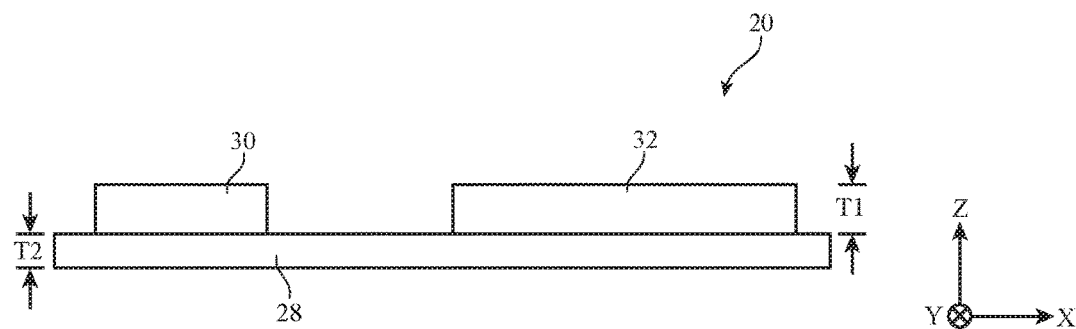
FIG. 2B is a top view of an illustrative near-eye display system having an optical system including an input coupler and an output coupler formed on a waveguide substrate in accordance with an embodiment.

Optical system 20B may include one or more couplers such as input coupler 30 and output coupler 32. In the example of FIG. 2A, input coupler 30 and output coupler 32 are at least partially embedded in a waveguide structure such as waveguide 28 (e.g., a polymer, glass, or other transparent substrate capable of guiding light via total internal reflection). In the example of FIG. 2B, input coupler 30 and output coupler 32 are formed on an outer surface of waveguide 28.

Input coupler 30 may be configured to couple light 38 from display unit 36 into waveguide 28, whereas output coupler 32 may be configured to couple light 38 from within waveguide 28 to the exterior of waveguide 28 towards the user's eyes 16. For example, display 36 may emit light 38 in direction Z towards optical system 20B. When light 38 strikes input coupler 30, input coupler 30 may redirect light 38 so that it propagates within waveguide 28 via total internal reflection towards output coupler 32 (e.g., in direction X). When light 38 strikes output coupler 32, output coupler 32 may redirect light 38 out of waveguide 28 towards the viewer's eyes 16 (e.g., back along the Z-axis).

Input coupler 30 and output coupler 32 may be based on reflective and refractive optics or may be based on holographic (e.g., diffractive) optics. In arrangements where couplers 30 and 32 are formed from reflective and refractive optics, couplers 30 and 32 may include one or more reflectors (e.g., an array of micromirrors or other reflectors). In arrangements where couplers 30 and 32 are based on holographic optics, couplers 30 and 32 may include volume holographic media such as photopolymers, gelatin such as dichromated gelatin, silver halides, holographic polymer dispersed liquid crystal, or other suitable volume holographic media.

A holographic recording may be stored as an optical interference pattern (e.g., alternating regions of different indices of refraction) within the photosensitive optical material. The optical interference pattern may create a holographic grating that, when illuminated with a given light source, diffracts light to create a three-dimensional reconstruction of the holographic recording. The diffractive grating may be a non-switchable diffractive grating that is encoded with a permanent interference pattern or may be a switchable diffractive grating in which the diffracted light can be modulated by controlling an electric field applied to the holographic recording medium.

If desired, couplers 30 and 32 may have relatively large thicknesses compared to the thickness of waveguide 28. For example, thickness T1 of couplers 30 and 32 may be between 500 microns and 1000 microns, between 200 microns and 800 microns, greater than 1000 microns, or other suitable thickness, whereas the thickness T2 of waveguide 28 may be between 100 microns and 500 microns, between 200 microns and 300 microns, between 1 mm and 2 mm, less than 3 mm, greater than 3 mm, or other suitable thickness. In arrangements where couplers 30 and 32 are formed on the surface of waveguide 28 as shown in FIG. 2B (e.g., as opposed to being embedded in waveguide 28 as shown in FIG. 2A), thickness T1 of couplers 30 and 32 may be greater than thickness T2 of waveguide 28, if desired. This is, however, merely illustrative. If desired, couplers 30 and 32 may be relatively thin (e.g., 50 microns) and waveguide 28 may be relatively thick (e.g., 500 microns).

Using thick films for couplers 30 and 32 may help increase uniformity in the output image and may provide more material in which to record different optical functions. With thicker couplers, for example, more material is available for recording different interference patterns (e.g., a first interference pattern with a first optical function may be recorded at one depth within the coupler, a second interference pattern with a second optical function may be recorded at another depth within the coupler, etc.). One optical function recorded in coupler 30, for example, may redirect light having a given input angle to a first output angle (e.g., 45°), whereas another optical function recorded in coupler 30 may redirect light having a given input angle to a second output angle (e.g., 60°).

Couplers 30 and 32 may, if desired, be multiplex holograms (e.g., three-color holograms such as red-green-blue holograms) for forming color three-dimensional images. The diffraction efficiency in each coupler 30 and 32 may be modulated (e.g., may vary across the width of couplers 30 and 32) so that light exits each coupler in a smooth, uniform manner. For example, the diffraction efficiency may be higher for areas that are further from the light source (e.g., the diffraction efficiency in a region of coupler 30 or 32 that is closer to display unit 36 may be 10%, while the diffraction efficiency in a region of coupler 30 or 32 that is further from display unit 36 may be 70%, as an example).

Figure 3:
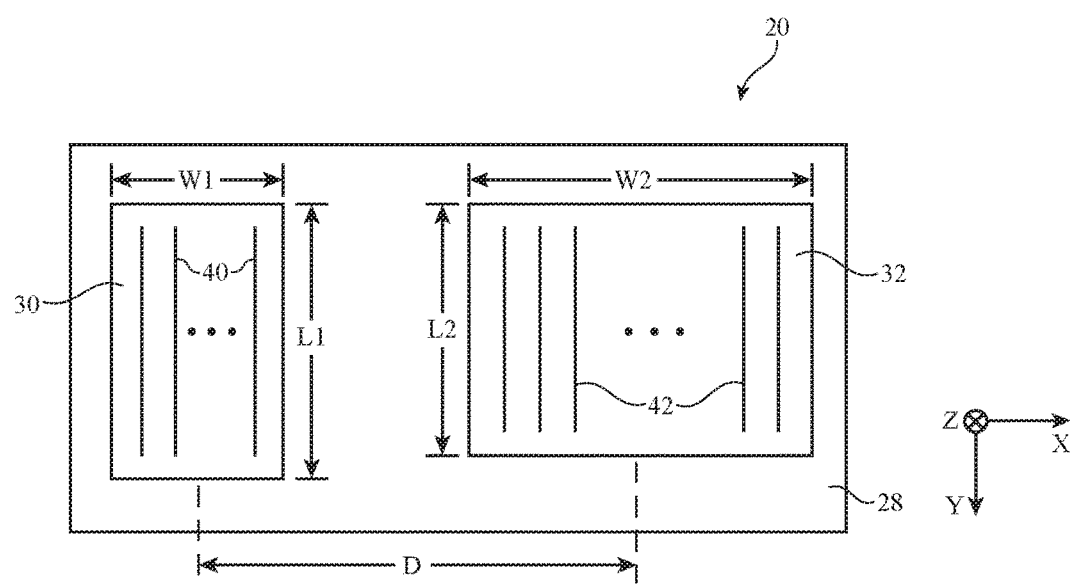
FIG. 3 is a front view of an illustrative near-eye display system showing how optical interference patterns may be encoded in an input coupler and an output coupler in accordance with an embodiment.

FIG. 3 is a front view of an illustrative optical system 20B that may be used in near-eye display system 20. In the example of FIG. 3, input coupler 30 is somewhat smaller than output coupler 32. Input coupler 30 may, for example, have a width W1 of about 16 mm and a length L1 of about 32 mm, whereas output coupler 32 may have a width W2 of about 37 mm and a length of about 26 mm. The distance D between the center of input coupler 30 and the center of output coupler 32 may be about 45 mm or other suitable distance. These dimensions are merely illustrative, however. Other dimensions may be used, if desired (e.g., input coupler 30 may be the same size as or bigger than output coupler 32).

As shown in FIG. 3, input coupler 30 has one or more optical interference patterns 40 and output coupler 32 has one or more optical interference patterns 42. Each optical interference pattern may redirect incident light 38 according to an associated optical function. In the example of FIG. 3, interference patterns 40 and 42 are formed from vertical strips (e.g., strips parallel to the Y-axis of FIG. 3) of alternating indices of refraction. This forms a diffraction grating that redirects incoming light at a desired angle.

Figure 4:
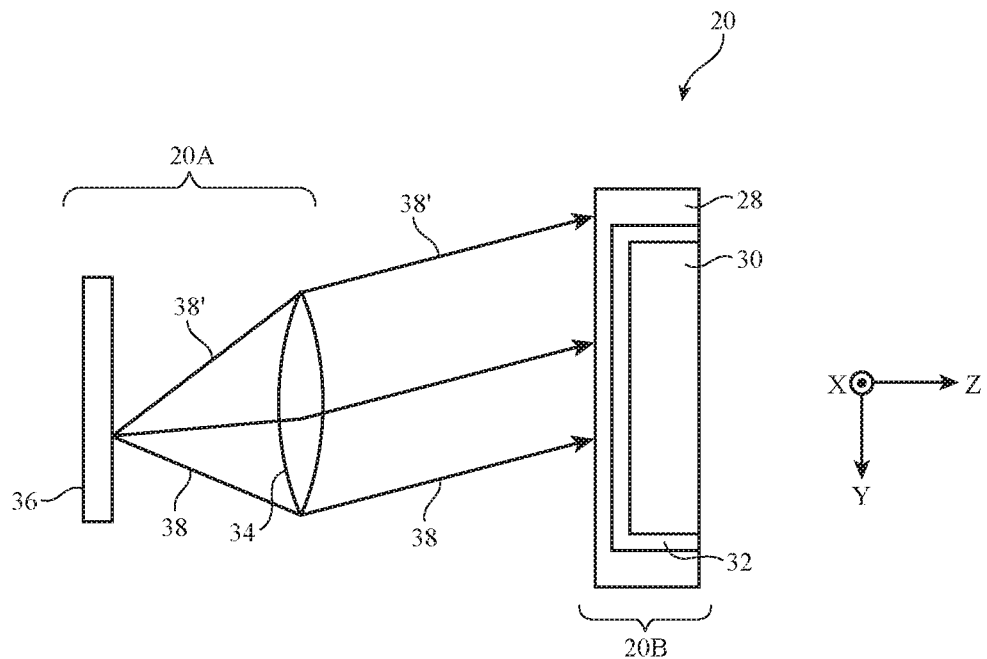
FIG. 4 is a side view of an illustrative near-eye display system showing how light from a display may be emitted towards an optical system in accordance with an embodiment.
Figure 5:
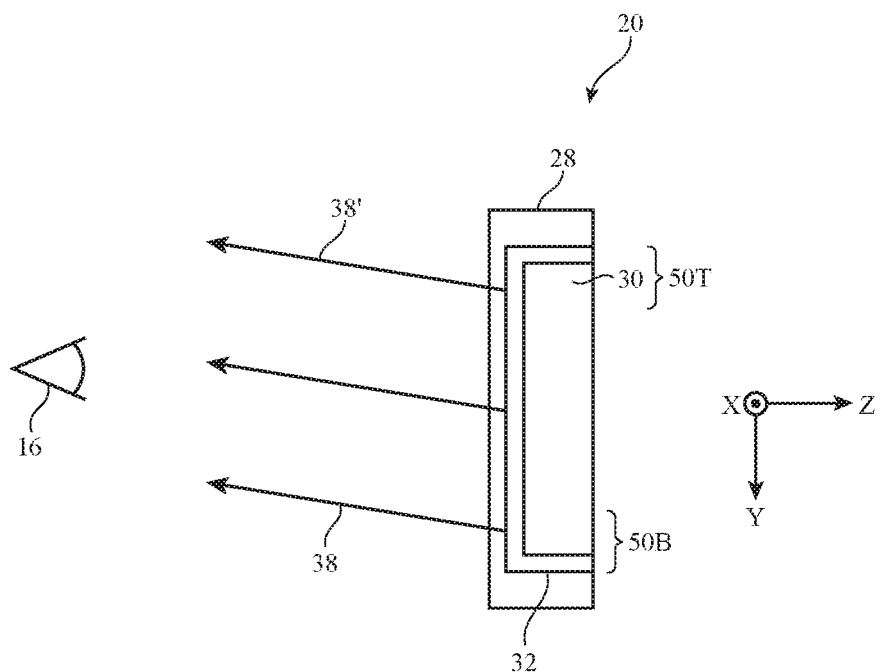
FIG. 5 is a side view of the near-eye display system of FIG. 4 showing how the optical system may redirect light from the display towards a user's eye in accordance with an embodiment.

FIGS. 4 and 5 are side views of an illustrative near-eye display 20 showing how an optical system 20B of the type shown in FIG. 3 may redirect light towards a user's eyes 16. FIG. 4 shows how light is input into optical system 20B, and FIG. 5 shows how light may exit optical system 20B. As shown in FIG. 4, display unit 36 may emit light 38 towards optical system 20B. Collimating lens 34 may collimate light 38 to focus light 38 onto optical system 20B. Light 38 traveling from collimator 34 to system 20B can be represented by a vector having an X-component (parallel to the X-axis), a Y-component (parallel to the Y-axis) and a Z-component (parallel to the Z-axis).

Interference patterns 40 in input coupler 30 may redirect incoming light 38 so that it propagates along the X-axis in waveguide 28 towards output coupler 32. Interference patterns 42 in output coupler 32 may redirect incoming light 38 so that it stops propagating in the X-direction and instead exits waveguide 28 in direction Z (as shown in FIG. 5).

If care is not taken, some of light 38 may be outside of the field of view of viewer's eye 16. For example, some light rays such as edge light ray 38' may not reach user's eye 16. This is because vertical-strip interference patterns 40 and 42 of FIG. 3 alter the X-component of incident light 38 (e.g., so that light 38 propagates in direction X towards output coupler 32) but do not alter the Y-component of incident light 38. Thus, light rays 38 that exit output coupler 32 from top portion 50T and bottom portion 50B of output coupler 32 may pass over or under the user's field of view.

Figure 6:
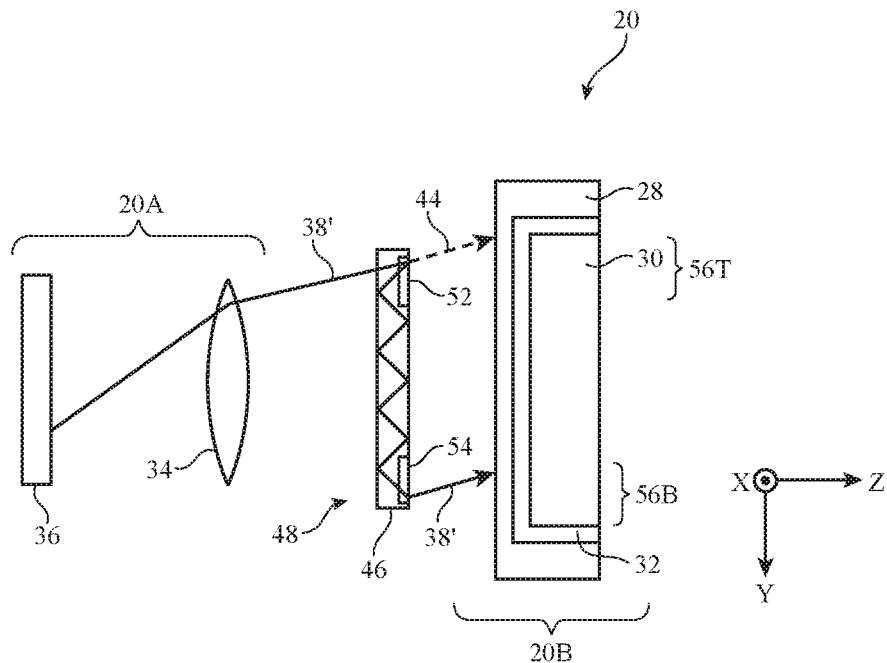
FIG. 6 is a side view of an illustrative near-eye display system that includes a light-redirecting element between a display and an input coupler in accordance with an embodiment.
Figure 7:
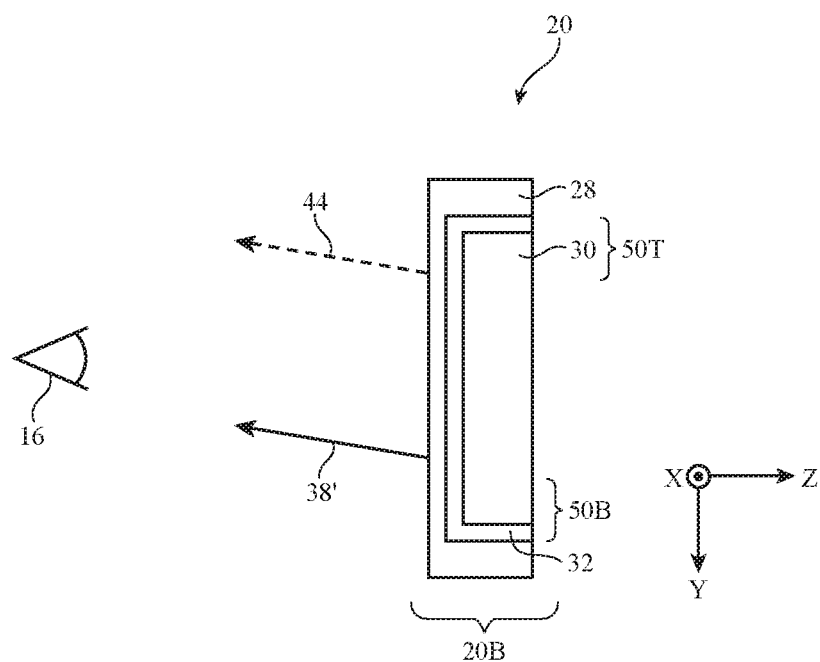
FIG. 7 is a side view of the near-eye display system of FIG. 6 showing how light that would otherwise be outside of the user's field of view has been redirected towards the user's field of view in accordance with an embodiment.
Figure 8:
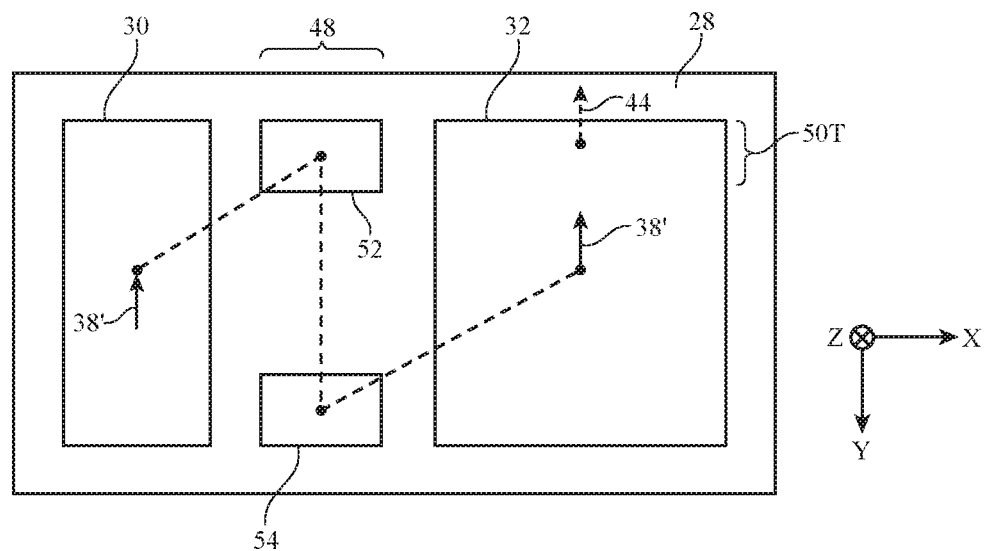
FIG. 8 is a front view of an illustrative near-eye display system that includes a light-redirecting element between an input coupler and an output coupler in accordance with an embodiment.
Figure 9:
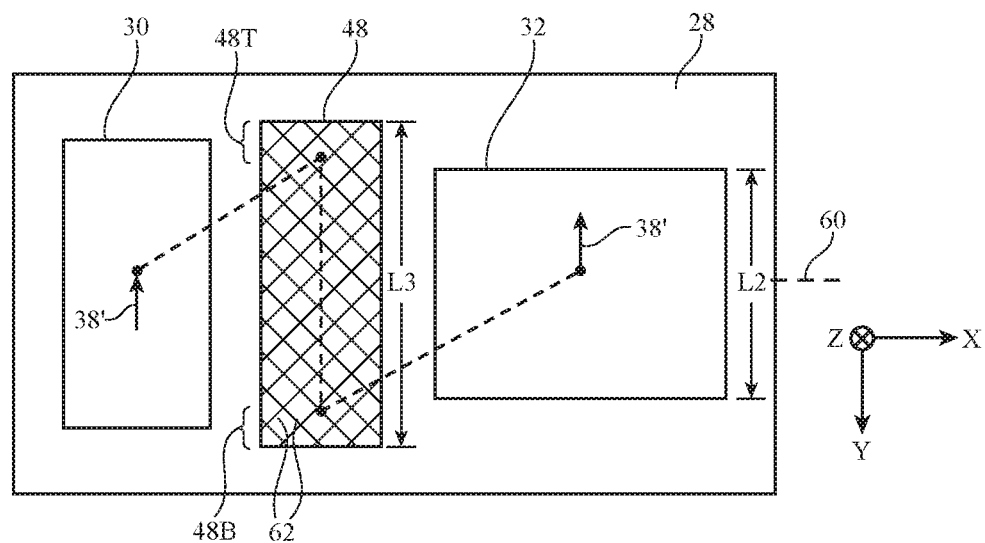
FIG. 9 is a front view of an illustrative near-eye display system that includes a light-redirecting element that spans a space between an input coupler and an output coupler in accordance with an embodiment.

To minimize the amount of light 38 that is outside of the user's field of view, near-eye display system 20 may include a light-redirecting element that redirects edge light (e.g., light 38' of FIG. 4) to a different location so that it is within the field of view of the user. FIGS. 6 and 7 illustrate an example in which a light-redirecting element 48 is located in front of input coupler 30 (e.g., between display 36 and input coupler 30); FIGS. 8 and 9 illustrate examples in which light-redirecting element 48 is located between input coupler 30 and output coupler 32; and FIGS. 10-13 illustrate examples in which light-redirecting element 48 is integrated with output coupler 32. If desired, embodiments that employ a combination of features shown in FIGS. 1-13 may be used. For example, light-redirecting elements may be located in more than one location (e.g., a first light-redirecting element may be located between input coupler 30 and output coupler 32 and a second light-redirecting element may be integrated with output coupler 32).

Light-redirecting element 48 may, if desired, include multiplex holograms (e.g., three-color holograms such as red-green-blue holograms) for forming color three-dimensional images. The diffraction efficiency in light-redirecting element 48 may be modulated (e.g., may vary across the width of light-redirecting element 48 so that light exits light-redirecting element 48 in a smooth, uniform manner. For example, the diffraction efficiency may be higher for areas that are further from the light source (e.g., the diffraction efficiency in a region of light-redirecting element 48 that is closer to display unit 36 may be 10%, while the diffraction efficiency in a region of coupler light-redirecting element 48 that is further from display unit 36 may be 70%, as an example).

As shown in FIG. 6, light-redirecting element 48 may include an input coupler 52 and output coupler 54 formed on a waveguide such as waveguide 46. Light-redirecting element 48 may be attached to optical system 20B or may be mounted to other structures in display 20. Light-redirecting element 48 may operate similarly to optical system 20B. For example, couplers 52 and 54 may be holographic optical elements with encoded interference patterns that redirect incident light according to a given optical function. However, rather than propagating light in the X-direction, as in optical system 20B, light-redirecting element 48 may be used to propagate light along the Y-direction (e.g., from input coupler 52 to output coupler 54).

For example, input coupler 52 may have one or more interference patterns that redirects edge light 38' from display module 20A so that it propagates in waveguide 46 in direction Y via total internal reflection towards output coupler 54. Output coupler 54 may redirect light 38' so that it exits element 48 towards optical system 20B. Rather than striking top portion 56T of input coupler 30 (as indicated by dashed line 44), light 38' is emitted towards bottom portion 56B of input coupler 30. Thus, when light 38' exits output coupler 32, as shown in FIG. 7, it will exit from bottom portion 50B of output coupler 32 towards user's eye 16 (as opposed to exiting from top portion 50T of output coupler 32 as indicated by arrow 44).

The example of FIG. 6 in which input coupler 52 and output coupler 54 are embedded in waveguide 46 is merely illustrative. If desired, couplers 52 and 54 may be attached to an outer surface of waveguide 46 (e.g., both on the front surface of waveguide 46 facing display unit 36, both on the rear surface of waveguide 46 facing waveguide 28, or one on the front surface of waveguide 46 and the other on the rear surface of waveguide 46).

In the example of FIG. 8, light-redirecting element 48 may be interposed between input coupler 30 and output coupler 32. Rather than being mounted on a separate waveguide, as in the example of FIG. 6, input coupler 52 and output coupler 54 of light-redirecting element 48 are formed on or in waveguide 28 between input coupler 30 and output coupler 32.

Input coupler 30 may redirect edge light 38' so that it propagates in the X-direction towards input coupler 52. Input coupler 52 may have one or more interference patterns that redirects edge light 38' from input coupler 30 so that it propagates in waveguide 28 in direction Y via total internal reflection towards output coupler 54. Output coupler 54 may have one or more interference patterns that redirects light 38' so that it propagates in the X-direction towards output coupler 32. Output coupler 32 may redirect the light from output coupler 54 so that it exits waveguide 28 towards the user's eyes 16 (as opposed to exiting from top portion 50T of output coupler 32 as indicated by arrow 44).

FIG. 9 shows another example in which light-redirecting element 48 is interposed between input coupler 30 and output coupler 32. In this example, light-redirecting element 48 is formed from a film having a length L3 that is larger than the length L2 of output coupler 32. Light-redirecting element 48 has interference patterns 62 which are non-parallel to the Y-axis. Interference patterns 62 may be configured to redirect the Y-component of light 38' so that light 38' is directed towards the user's eyes 16. For example, as illustrated in FIG. 9, interference pattern 62 in top portion 48T of light-redirecting element 48 may redirect the Y-component of edge light 38' that strikes top portion 48T downward in the Y-direction towards interference pattern 62 in bottom portion 48B of light-redirecting element 48, which may in turn redirect the Y-component of edge light 38' upward towards output coupler 32. Similarly, interference pattern 62 in bottom portion 48B of light-redirecting element 48 may redirect the Y-component of edge light 38' that strikes bottom portion 48B upward in the Y-direction towards interference pattern 62 in top portion 48T of light-redirecting element 48, which may in turn redirect the Y-component of edge light 38' downward towards output coupler 32. Output coupler 32 may redirect the light from light-redirecting element 48 so that it exits waveguide 28 towards the user's eyes 16.

Figure 10:
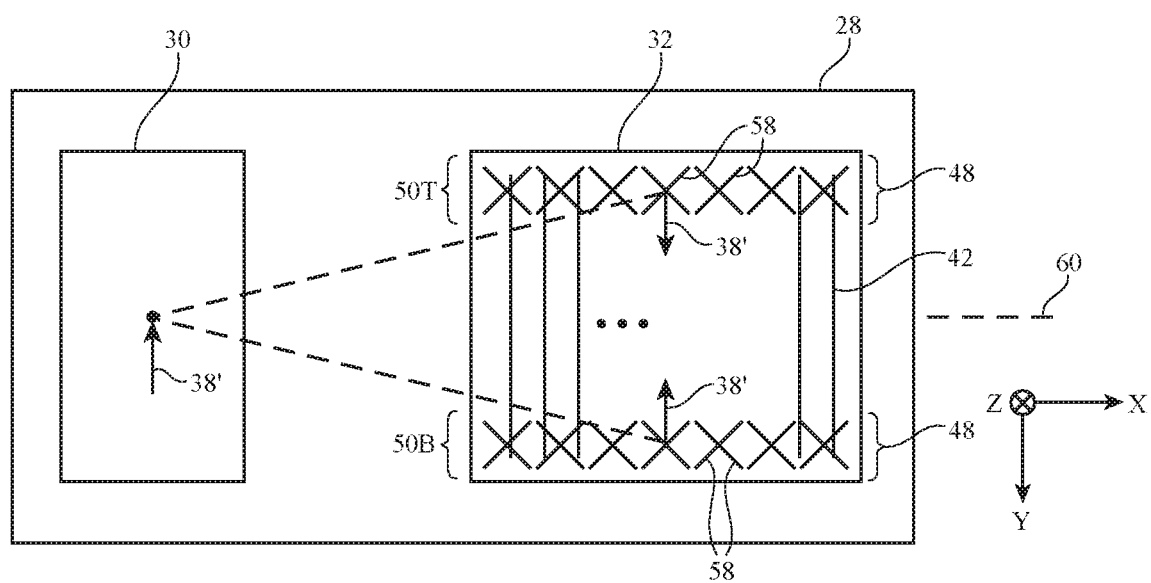
FIG. 10 is a front view of an illustrative near-eye display system that includes a light-redirecting element integrated or multiplexed with an output coupler in accordance with an embodiment.

In the example of FIG. 10, one or more light-redirecting elements 48 may be integrated into output coupler 32. Light-redirecting elements 48 of FIG. 10 may include optical interference patterns that are encoded in coupler 32. Thus, coupler 32 includes not only vertical strips of interference patterns 42 parallel to the Y-axis, but also interference patterns 58 which are non-parallel to the Y-axis. Interference patterns 58 may be configured to redirect the Y-component of light 38' so that light 38' is directed towards the user's eyes 16. For example, interference pattern 58 in top portion 50T of output coupler 32 may redirect the Y-component of edge light 38' that strikes top portion 50T downward in the Y-direction towards eye level 60, whereas interference pattern 58 in bottom portion 50B of output coupler 32 may redirect the Y-component of edge light 38' that strikes bottom portion 50B upward in the Y-direction towards eye level 60.

Figure 11:
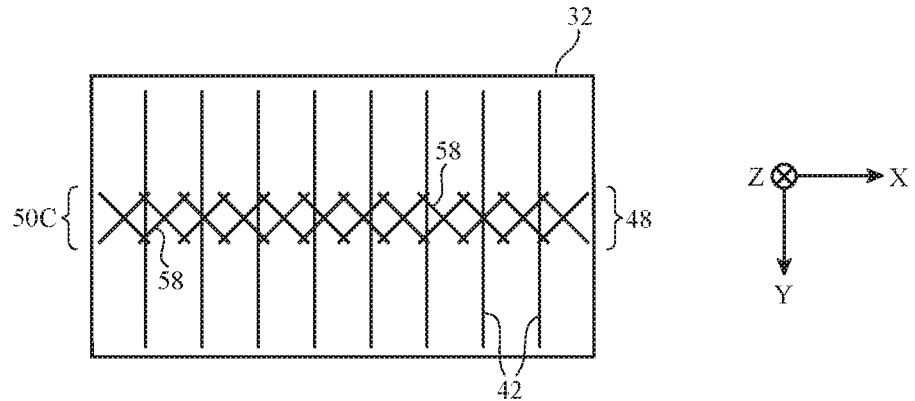
FIG. 11 is a front view of an illustrative output coupler having an integrated light-redirecting element at the center of the output coupler in accordance with an embodiment.
Figure 12:
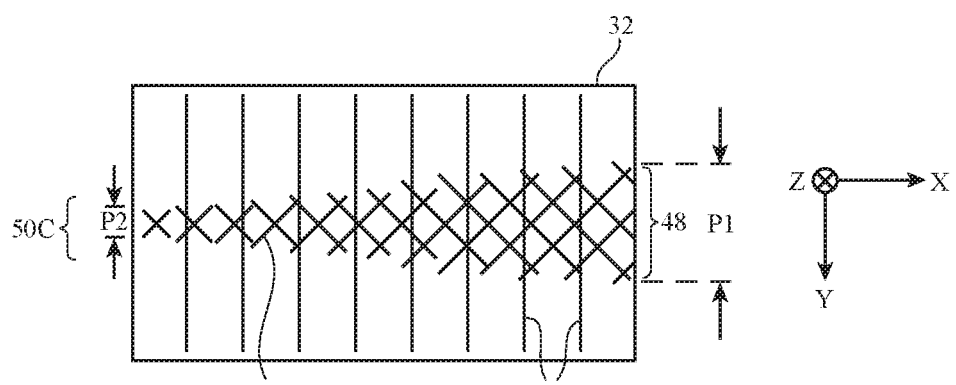
FIG. 12 is a front view of an illustrative output coupler having an integrated or multiplexed light-redirecting element that increases in size along a dimension of the output coupler in accordance with an embodiment.
Figure 13:
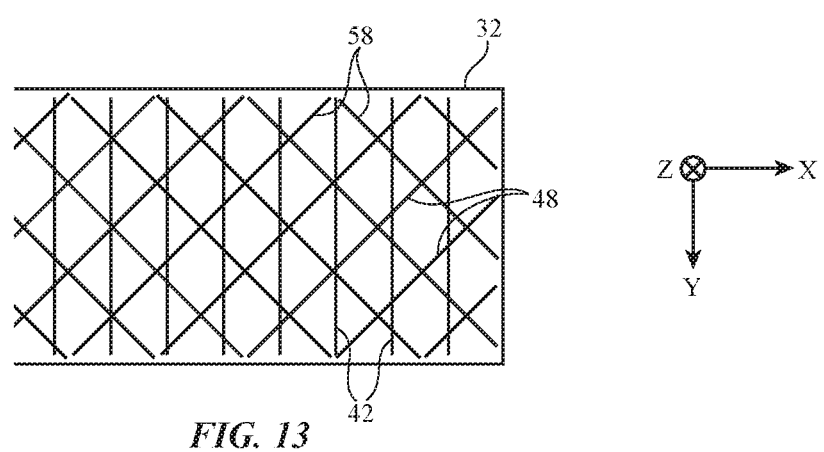
FIG. 13 is a front view of an illustrative output coupler having an integrated light-redirecting element located throughout the output coupler in accordance with an embodiment.

The example of FIG. 10 in which interference patterns 58 are only located in top portion 50T and bottom portion 50B of output coupler 50 is merely illustrative. If desired, interference patterns 58 may be encoded at center portion 50C of output coupler 32, as shown in the example of FIG. 11. In the example of FIG. 12, interference patterns 58 are encoded at center portion 50C of output coupler 32 and increase in size along the X-direction (e.g., from size P1 to size P2). This may help ensure that light is diffracted from output coupler 32 in a smooth, uniform manner. In the example of FIG. 13, interference patterns 58 are encoded throughout output coupler 32. These examples are merely illustrative, however. If desired, interference patterns 58 may be encoded in output coupler 32 in other suitable locations, sizes, patterns, etc. Arrangements in which light-redirecting element 48 is integrated with input coupler 30 (e.g., by encoding interference patterns that are non-parallel with the Y-axis) may also be used.

In accordance with an embodiment, a display system is provided that includes a display unit, an optical system that receives light from the display unit and that redirects the light out of the optical system, the optical system includes an input coupler, an output coupler, and a first waveguide that propagates light along a first direction, and a light-redirecting element interposed between the display unit and the optical system, the light-redirecting element includes a second waveguide that propagates light along a second direction.

In accordance with another embodiment, the input coupler and the output coupler each include a holographic optical element.

In accordance with another embodiment, the input coupler receives the light from the light-redirecting element and redirects the light towards the output coupler.

In accordance with another embodiment, the output coupler receives the light from the input coupler and redirects the light out of the optical system.

In accordance with another embodiment, light-redirecting element includes an additional input coupler and an additional output coupler on the second waveguide.

In accordance with another embodiment, the additional input coupler and the additional output coupler each include a holographic optical element.

In accordance with another embodiment, the additional input coupler receives the light from the display unit and redirects the light towards the additional output coupler.

In accordance with another embodiment, the additional output coupler receives the light from the additional input coupler and redirects the light towards the input coupler.

In accordance with another embodiment, the first direction is perpendicular to the second direction.

In accordance with an embodiment, a display system is provided that includes a display unit, an optical system that receives light from the display unit and that redirects the light out of the optical system, where the optical system includes a first input coupler, a first output coupler, and a waveguide and a light-redirecting element interposed between the input coupler and the output coupler, where the light-redirecting element includes a second input coupler and a second output coupler on the waveguide, and the second input coupler receives the light from the first input coupler and the first output coupler receives the light from the second output coupler.

In accordance with another embodiment, the first and second input couplers and the first and second output couplers each include a holographic optical element.

In accordance with another embodiment, the waveguide propagates light from the first input coupler to the second input coupler along a first direction and the waveguide propagates light from the second input coupler to the second output coupler along a second direction.

In accordance with another embodiment, the first direction is perpendicular to the second direction.

In accordance with another embodiment, the first input coupler has smaller dimensions than the first output coupler.

In accordance with an embodiment, a display system is provided that includes a display unit, and an optical system that receives light from the display unit and that redirects the light out of the optical system, where the optical system includes an input coupler, an output coupler, and a waveguide that propagates light from the input coupler to the output coupler, and the output coupler includes first and second non-parallel interference patterns.

In accordance with another embodiment, a thickness of the input and output couplers is greater than a thickness of the waveguide.

In accordance with another embodiment, the input and output couplers each includes holographic optical elements.

In accordance with another embodiment, the holographic optical elements are color multiplexed.

In accordance with another embodiment, the first and second interference patterns each have a modulated diffraction efficiency.

In accordance with another embodiment, the second interference pattern is located in an upper portion of the output coupler and a lower portion of the output coupler.

The foregoing is merely illustrative and various modifications can be made to the described embodiments. The foregoing embodiments may be implemented individually or in any combination.

What is claimed is:

1. A display system, comprising:
   a head-mounted support structure;
   a display unit in the head-mounted support structure;
   an optical system that receives light from the display unit and that redirects the light out of the optical system, wherein the optical system includes an input coupler, an output coupler, and a first waveguide that propagates the light along a first direction, wherein the input coupler couples the light into the first waveguide and the output coupler couples the light out of the first waveguide, and wherein the input coupler and the output coupler are located on the same side of the first waveguide; and
   a light-redirecting element interposed between the display unit and the optical system, wherein the light-redirecting element includes a second waveguide that propagates the light along a second direction and includes an additional input coupler and an additional output coupler on the second waveguide, wherein the additional input coupler receives the light from the display unit and redirects the light towards the additional output coupler, wherein the additional output coupler receives the light from the additional input coupler and redirects the light towards the input coupler, and wherein the first direction is perpendicular to the second direction.

2. The display system defined in claim 1 wherein the input coupler and the output coupler each include a holographic optical element.

3. The display system defined in claim 1 wherein the input coupler receives the light from the light-redirecting element and redirects the light towards the output coupler.

4. The display system defined in claim 3 wherein the output coupler receives the light from the input coupler and redirects the light out of the optical system.

5. The display system defined in claim 1 wherein the additional input coupler and the additional output coupler each include a holographic optical element.

6. A display system, comprising:
   a head-mounted support structure;
   a display unit in the head-mounted support structure;
   an optical system that receives light from the display unit and that redirects the light out of the optical system, wherein the optical system includes a first input coupler, a first output coupler, and a waveguide, and wherein the first input coupler and the first output coupler are located on the same side of the waveguide; and
   a light-redirecting element interposed between the input coupler and the output coupler, wherein the light-redirecting element includes a second input coupler and a second output coupler on the waveguide, and wherein the second input coupler receives the light from the first input coupler and the first output coupler receives the light from the second output coupler.

7. The display system defined in claim 6 wherein the first and second input couplers and the first and second output couplers each comprise a holographic optical element.

8. The display system defined in claim 6 wherein the waveguide propagates light from the first input coupler to the second input coupler along a first direction and wherein the waveguide propagates light from the second input coupler to the second output coupler along a second direction.

9. The display system defined in claim 8 wherein the first direction is perpendicular to the second direction.

10. The display system defined in claim 6 wherein the first input coupler has smaller dimensions than the first output coupler.

11. A display system, comprising:
    a head-mounted support structure;
    a display unit in the head-mounted support structure; and
    an optical system that receives light from the display unit and that redirects the light out of the optical system, wherein the optical system includes an input coupler, an output coupler, and a waveguide that propagates light from the input coupler to the output coupler, wherein the output coupler includes first and second non-parallel interference patterns, and wherein the input coupler and the output coupler are located on the same side of the waveguide.

12. The display system defined in claim 11 wherein a thickness of the input and output couplers is greater than a thickness of the waveguide.

13. The display system defined in claim 11 wherein the input and output couplers each comprise holographic optical elements.

14. The display system defined in claim 13 wherein the holographic optical elements are color multiplexed.

15. The display system defined in claim 11 wherein the first and second non-parallel interference patterns each have a modulated diffraction efficiency.

16. The display system defined in claim 11 wherein the second interference pattern is located in an upper portion of the output coupler and a lower portion of the output coupler.

* * * * *